US011866221B2

(12) United States Patent
Hirata et al.

(10) Patent No.: US 11,866,221 B2
(45) Date of Patent: Jan. 9, 2024

(54) LABEL PRINTING DEVICE

(71) Applicant: Ishida Co., Ltd., Kyoto (JP)

(72) Inventors: Kosuke Hirata, Ritto (JP); Takashi Furukawa, Ritto (JP); Masatsugu Tanaka, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 17/578,895

(22) Filed: Jan. 19, 2022

(65) Prior Publication Data

US 2022/0297870 A1 Sep. 22, 2022

(30) Foreign Application Priority Data

Mar. 19, 2021 (JP) ................................ 2021-046067

(51) Int. Cl.

| | |
|---|---|
| ***B65C 9/42*** | (2006.01) |
| ***B41J 3/407*** | (2006.01) |
| ***B65C 9/18*** | (2006.01) |
| ***B41J 11/36*** | (2006.01) |
| ***B41J 15/16*** | (2006.01) |
| ***B65D 83/64*** | (2006.01) |
| ***B41J 11/00*** | (2006.01) |
| ***B41J 11/66*** | (2006.01) |
| ***B41J 11/70*** | (2006.01) |

(52) U.S. Cl.

CPC .............. *B65C 9/42* (2013.01); *B41J 3/4075* (2013.01); *B41J 11/36* (2013.01); *B41J 11/663* (2013.01); *B41J 11/703* (2013.01); *B41J 15/165* (2013.01); *B65C 9/1803* (2013.01); *B41J 11/0095* (2013.01)

(58) Field of Classification Search

CPC ....... B41J 11/0095; B41J 11/36; B41J 11/663; B41J 11/703; B41J 15/165; B41J 3/4075; Y02E 60/10; B65D 83/643; B65C 9/1803; B65C 9/42

See application file for complete search history.

(56) References Cited

FOREIGN PATENT DOCUMENTS

| | | | | |
|---|---|---|---|---|
| EP | 4059727 A1 * | 9/2022 | ............ | B41J 3/4075 |
| JP | 2016-153198 A | 8/2016 | | |

* cited by examiner

*Primary Examiner* — Sonya M Sengupta
(74) *Attorney, Agent, or Firm* — Studebaker & Brackett PC

(57) ABSTRACT

A label printing device includes: a conveying unit configured to convey a mountless label; a shaft portion configured to change a conveying direction of the mountless label; a cutting unit configured to cut the mountless label of which the conveying direction is changed by the shaft portion and issue a label; and a controller configured to control the conveying unit and the cutting unit. The controller executes a preparatory operation mode in which the mountless label is conveyed a predetermined distance longer than a length of a portion extending from the shaft portion to the cutting unit in the mountless label by the conveying unit and is cut by the cutting unit when a label is not issued for more than a predetermined time.

9 Claims, 6 Drawing Sheets

LABEL PRINTING DEVICE

TECHNICAL FIELD

An aspect of the present disclosure relates to a label printing device.

BACKGROUND

As a label printing device, for example, a device described in Japanese Unexamined Patent Publication No. 2016-153198 is known. The label printing device described in Japanese Unexamined Patent Publication No. 2016-153198 includes a conveying mechanism configured to convey a mountless label in its longitudinal direction, a printing mechanism which prints product information on the mountless label conveyed by the conveying mechanism, and a controller configured to control at least one of the conveying mechanism and the printing mechanism. In the label printing device described in Japanese Unexamined Patent Publication No. 2016-153198, the controller has a first printing mode for printing the product information on the mountless label in a first printing state and a second printing mode for printing the product information on the mountless label in a second printing state in which characters indicating the product information are compressed in the conveying direction of the mountless label compared to in the first printing state.

SUMMARY

In the above-described label printing device, a non-adhesive side of the mountless label to be conveyed is wound on a shaft portion, the conveying direction of the mountless label is changed by the shaft portion, the mountless label is cut by a cutting unit, and a label is issued. In such a label printing device, for example, when the label is left unissued for a predetermined time, a portion wound on the shaft portion in the mountless label is habitually warped. When the mountless label is cut at the habitual portion, the mountless label will be turned up. When the mountless label is further conveyed in this state, there is a risk of device abnormality that the habitual portion is stuck to a cutting blade of the cutting unit or the mountless label is caught so that the mountless label cannot be smoothly conveyed.

Here, an aspect of the present disclosure is to provide a label printing device capable of suppressing the occurrence of device abnormality.

A label printing device according to an aspect of the present disclosure is a label printing device for executing a printing process on a mountless label, including: a conveying unit configured to convey the mountless label in its longitudinal direction; a shaft portion configured to change a conveying direction of the mountless label while a non-adhesive side of the mountless label to be conveyed is wound thereon; a cutting unit configured to cut the mountless label of which the conveying direction is changed by the shaft portion and issue a label; and a controller configured to control the conveying unit and the cutting unit, wherein the controller executes a preparatory operation mode in which the mountless label is conveyed a predetermined distance longer than a length of a portion extending from the shaft portion to the cutting unit in the mountless label by the conveying unit and is cut by the cutting unit when a label is not issued for more than a predetermined time.

In the label printing device, even if there is a habitual portion wound on the shaft portion in the mountless label when the label is not issued for more than a predetermined time, it is possible to remove the habitual portion by executing the preparatory operation mode. Accordingly, it is possible to prevent the habitual portion from being stuck to a cutting blade of the cutting unit. That is, according to the label printing device of an aspect of the present disclosure, it is possible to suppress the occurrence of device abnormality.

The label printing device according to an aspect of the present disclosure may further include a printing unit configured to execute a printing process on the mountless label conveyed by the conveying unit and the shaft portion may change the conveying direction of the mountless label toward the printing unit. In this case, the shaft portion can guide the mountless label to the downstream printing unit.

In the label printing device according to an aspect of the present disclosure, the controller may execute the preparatory operation mode if it is determined that a label is not issued for more than the predetermined time since the label is issued at the last time when issuing a new label. In this case, it is possible to remove a habitual portion of the mountless label when issuing a new label.

The label printing device according to an aspect of the present disclosure may further include a label detection sensor configured to be provided in the periphery of a label issuing port and detects the presence or absence of the mountless label separated by cutting in the preparatory operation mode and the controller may prohibit the issuing of a new label when the label detection sensor detects the mountless label. If the mountless label separated by cutting in the preparatory operation mode is not taken out and left as it is in the periphery of the label issuing port, there is a possibility that device abnormality occurs due to the interfere of the mountless label when issuing a new label. Thus, in the label printing device according to an aspect of the present disclosure, the issuing of a new label is prohibited by determining that the mountless label is left as it is in the periphery of the label issuing port when the label detection sensor detects the mountless label. Accordingly, it is possible to avoid device abnormality which can be caused by the interfere of the mountless label when issuing a new label.

The label printing device according to an aspect of the present disclosure may further include a notification unit configured to notifie that the preparatory operation mode is to be executed when executing the preparatory operation mode. In this case, the operator can be effectively notified of the execution of the preparatory operation mode.

The label printing device according to an aspect of the present disclosure may further include an output unit configured to output an instruction of removing the mountless label separated by cutting in the preparatory operation mode from the label issuing port after the preparatory operation mode is executed. In this case, the operator can be urged to remove the mountless label separated by the preparatory operation mode.

The label printing device according to an aspect of the present disclosure may further include a first input unit configured to receive an input of a predetermined time. In this case, the operator can set a desired predetermined time via the first input unit.

The label printing device according to an aspect of the present disclosure may further include a second input unit configured to receive an input of a predetermined distance. In this case, the operator can set a desired predetermined distance via the second input unit.

The label printing device according to an aspect of the present disclosure may further include a third input unit configured to receive an input of prohibiting the execution of the preparatory operation mode. In this case, the operator can prohibit the execution of the preparatory operation mode via the third input unit.

DETAILED DESCRIPTION

Figure 1:
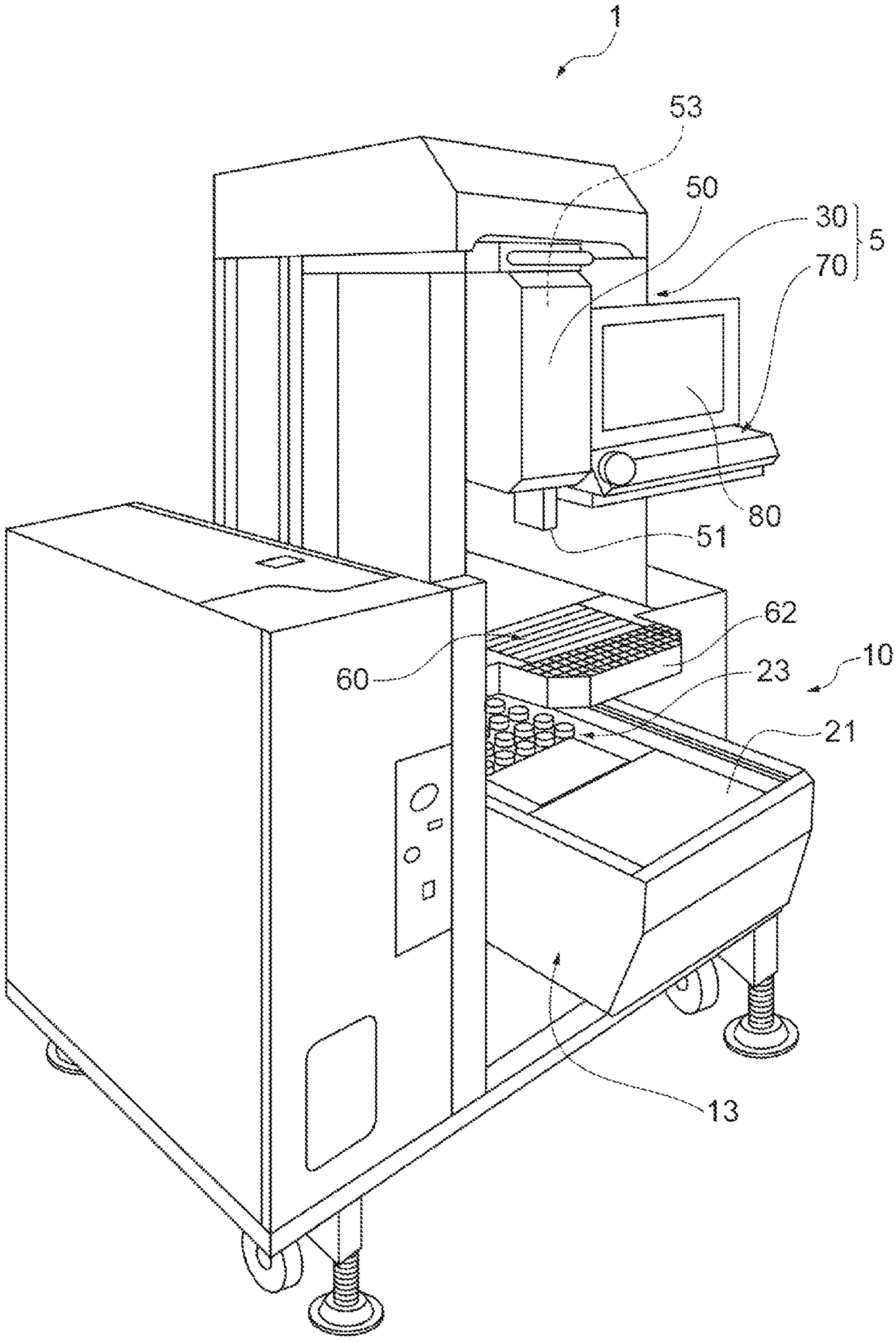
FIG. 1 is a perspective view showing a packaging device including a label printing device according to an embodiment.

Hereinafter, an embodiment will be described with reference to the drawings. In the description of the drawings, the same components will be denoted by the same reference numerals and the duplicate description will be omitted.

(1) Whole Configuration

Figure 2:
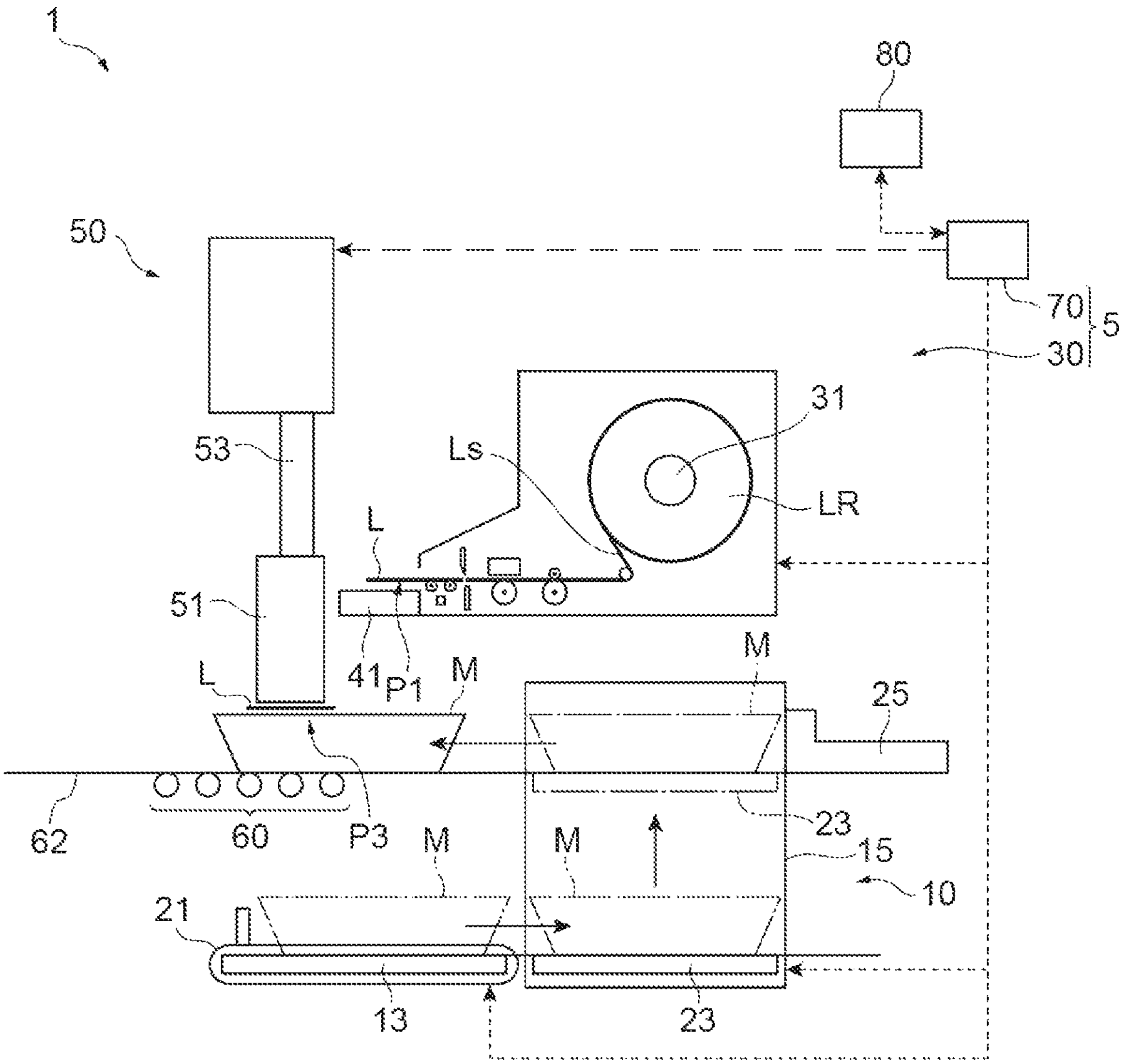
FIG. 2 is a schematic configuration diagram showing the packaging device of FIG. 1.

FIG. 1 is a perspective view showing a packaging device 1 including a label printing device 5 according to an embodiment. FIG. 2 is a schematic configuration diagram showing the packaging device 1. As shown in FIGS. 1 and 2, the packaging device 1 weighs and packages an article M (hereinafter, simply referred to as "article M") as a product containing an object to be packaged such as food in a tray and affixes a label L having production information printed thereon to the packaged article M. The packaging device 1 includes a weighing and packaging unit 10, a label issuing unit 30, a label affixing unit 50, a sealing mechanism 60, a control device 70, and a display input panel 80. The label printing device 5 includes a label issuing unit 30 and a control device (controller) 70.

The weighing and packaging unit 10 weighs and packages the article M. The weighing and packaging unit 10 includes a weighing unit 13, a conveying unit 21, a packaging unit 15, and a pusher 25. The weighing unit 13 weighs the article M placed on the weighing unit 13. The weighing unit 13 transmits a weighed value of the article M to the control device 70. The conveying unit 21 conveys the weighed article M to the packaging unit 15.

The packaging unit 15 packages the article M. The packaging unit 15 raises a lift 23 on which the article M is placed and presses the article against a film stretched over the lift 23 by a film feeder (not shown) to cover the upper surface of the article M with the film. The packaging unit 15 packages the article M by folding the film into the lower surface of the article M with a folding plate (not shown). The pusher 25 pushes the article M packaged by the packaging unit 15 to a position in which the label L is affixed to the article by the label affixing unit 50.

Figure 3:
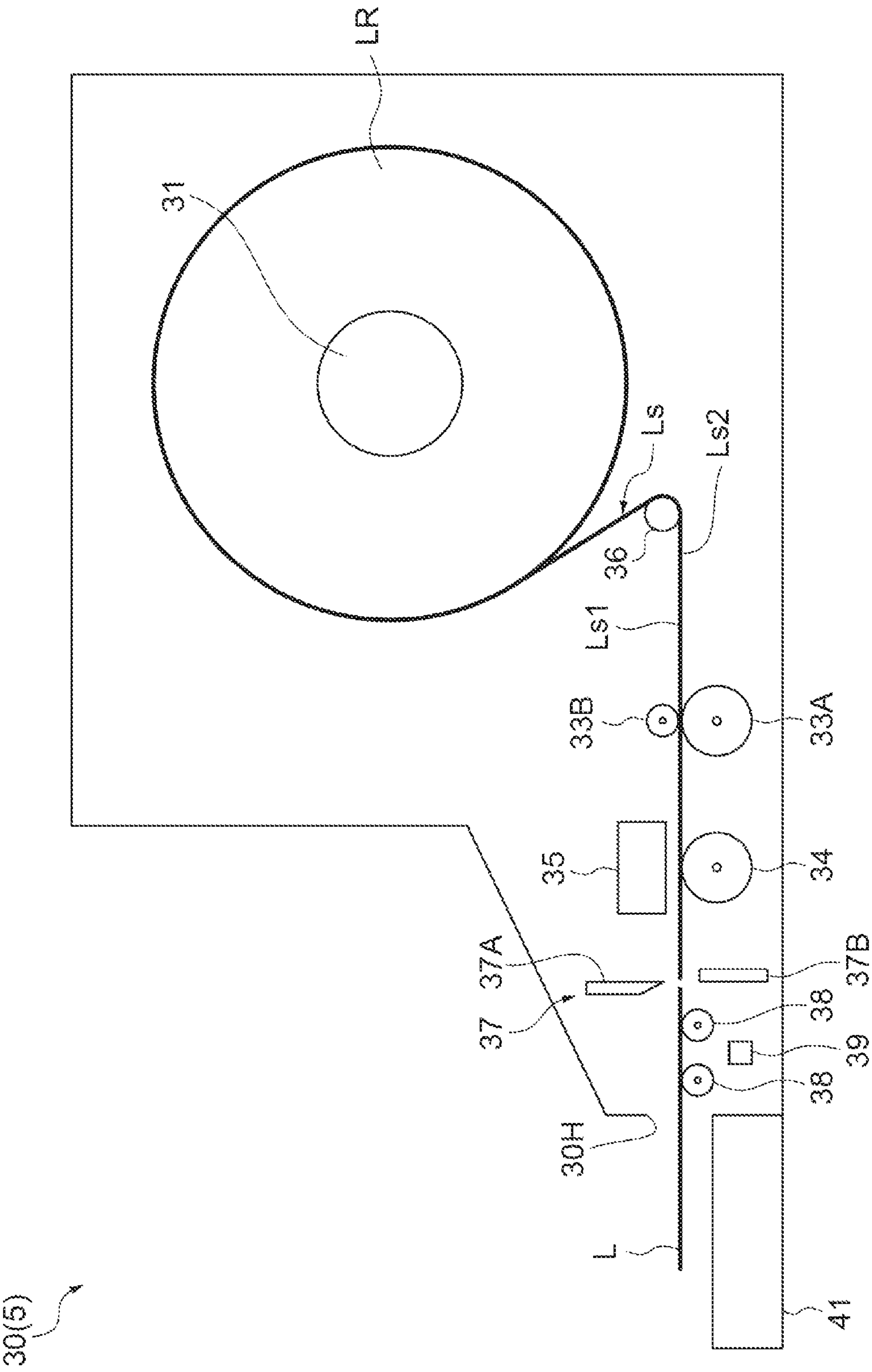
FIG. 3 is a schematic configuration diagram showing the label printing device of FIG. 1.

FIG. 3 is a schematic configuration diagram showing the label issuing unit 30. As shown in FIGS. 2 and 3, the label issuing unit 30 issues the label L to be affixed to the packaged article M. The label issuing unit 30 includes a roll holder 31, conveying rollers 33A and 33B, a printing roller 34, a thermal head 35, a shaft portion 36, a cutter mechanism (cutting unit) 37, a holding roller 38, a label detection sensor 39, and a label holding portion 41.

The roll holder 31 rotatably holds a label roll LR obtained by winding a tape-like mountless label Ls. The roll holder 31 pays out the mountless label Ls by rotating a rotation shaft to which the label roll LR is attached. The mountless label Ls is formed of a strip-shaped material (for example, a film or the like), one side thereof is a printing surface Ls1, and the other side is an adhesive surface Ls2. A heat-sensitive color-developing layer capable of developing at least two colors depending on the temperature is formed on the printing surface Ls1 of the mountless label Ls. An adhesive layer with adhesive is formed on the adhesive surface Ls2 of the mountless label Ls. In the mountless label Ls, the adhesive surface Ls2 does not have a mount and the size of the label L to be issued for one article M can be freely determined.

The conveying rollers 33A and 33B and the printing roller 34 constitute a conveying unit which conveys the mountless label Ls in its longitudinal direction. The conveying roller 33A is a driving roller which is disposed below the mountless label Ls. The conveying roller 33B is a driven roller which is disposed above the mountless label Ls. The conveying rollers 33A and 33B rotate with the mountless label Ls interposed therebetween. The printing roller 34 is disposed on the downstream side of the conveying rollers 33A and 33B in the conveying direction. The printing roller 34 is a driving roller which is disposed below the mountless label Ls.

The thermal head 35 constitutes a printing unit which prints product information or the like on the mountless label Ls to be conveyed. The thermal head 35 is disposed above the mountless label Ls. The thermal head 35 faces the printing roller 34 with the mountless label Ls interposed therebetween.

The side (non-adhesive side) of the printing surface Ls1 of the mountless label Ls to be conveyed is wound on the shaft portion 36. The shaft portion 36 changes the conveying direction of the mountless label Ls. The shaft portion 36 includes, for example, a columnar shaft body formed of metal. The shaft portion 36 is disposed on the upstream side of the conveying rollers 33A and 33B. The printing surface Ls1 of the mountless label Ls comes into contact with the surface of the shaft portion 36. The shaft portion 36 changes the conveying direction of the mountless label Ls so as to bend at an acute angle. That is, an angle formed between the mountless label Ls on the upstream side of the shaft portion 36 and the mountless label Ls on the downstream side of the shaft portion 36 is an acute angle. The shaft portion 36 changes the conveying direction of the mountless label Ls toward the thermal head 35.

The cutter mechanism 37 cuts (separates) the mountless label Ls at a predetermined position. The cutter mechanism 37 cuts the mountless label Ls of which the conveying direction is changed by the shaft portion 36 and issues the label L from a label issuing port 30H. The cutter mechanism 37 is disposed on the downstream side of the thermal head 35. The cutter mechanism 37 includes a moving cutter 37A and a fixed cutter 37B as cutting blades. In the cutter mechanism 37, the mountless label Ls is cut by reciprocating the moving cutter 37A with respect to the fixed cutter 37B. The holding roller 38 is a roller which holds the mountless label Ls (that is, the label L and a blank feed label to be described later) separated by cutting using the cutter mechanism 37 in a placed state. The holding roller 38 is disposed on the downstream side of the cutter mechanism 37.

The label detection sensor 39 detects the presence or absence of the label L and the blank feed label to be described later. As the label detection sensor 39, for example, a photoelectric sensor is used. The label detection sensor 39 is provided in the periphery of the label issuing port 30H. The label detection sensor 39 is disposed on the downstream side of the cutter mechanism 37. The label detection sensor 39 irradiates the label L and the blank feed label to be described later in the periphery of the label issuing port 30H with light and detects a reflected light which is reflected in accordance with the irradiation. In the example shown in the drawing, the label detection sensor 39 is disposed so that the label L and the blank feed label to be described later on the holding roller 38 can be detected. The label holding portion 41 is provided on the downstream side of the label issuing port 30H. The label holding portion 41 holds the label L and the blank feed label to be described later protruding outward from the label issuing port 30H.

Returning to FIG. 2, the label affixing unit 50 affixes the label L issued by the label issuing unit 30 to the packaged article M. The label affixing unit 50 includes a suction unit 51 and a moving unit 53. The suction unit 51 has a suction surface for sucking the label L and receives the label L from the label issuing unit 30 by absorbing air from a hole formed on the suction surface to suck the label. The suction unit 51 sucks the label L so that the center position of the suction unit 51 coincides with the center position of the label L.

The moving unit 53 is a moving mechanism for moving the suction unit 51 and moves the suction unit between a receiving position P1 for receiving the label L from the label issuing unit 30 and an affixing position P3 for affixing the label L to the article M packaged by the weighing and packaging unit 10. The moving unit 53 is driven by, for example, a driving unit (not shown) such as a stepping motor.

The sealing mechanism 60 heat-seals the film folded by the packaging unit 15. The sealing mechanism 60 includes a conveying roller and a heating roller and heat-seals the article M pushed out by the pusher 25 while conveying the article by the conveying roller and the heating roller. The sealing mechanism 60 discharges the packaged article M toward a discharge table 62.

(2) Control Device

Figure 4:
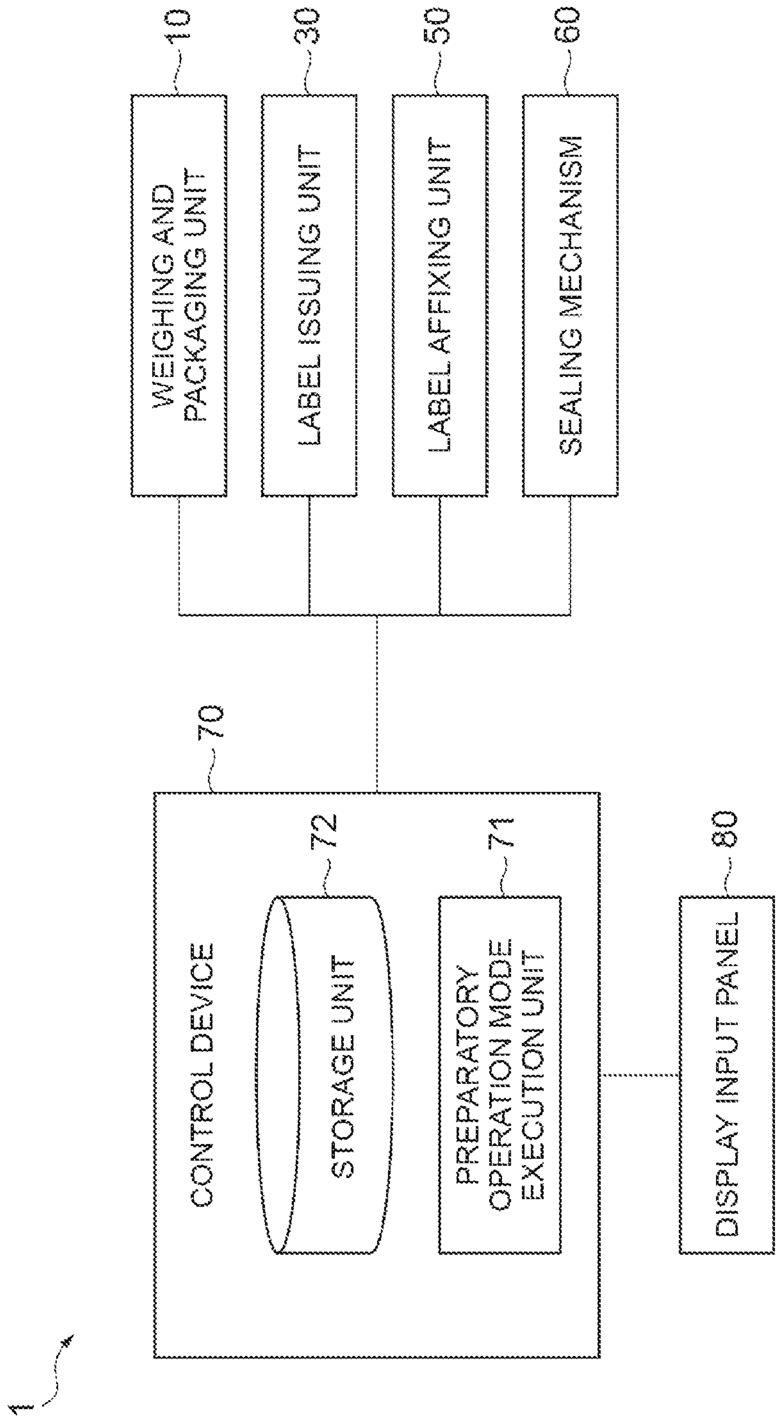
FIG. 4 is a control block diagram showing a functional configuration of the packaging device of FIG. 1.

The control device 70 is a part that controls various operations in the packaging device 1 and includes a CPU (Central Processing Unit), a ROM (Read Only Memory), a RAM (Random Access Memory), and the like. As shown in FIG. 4, the control device 70 controls the operations of the weighing and packaging unit 10, the label issuing unit 30, the label affixing unit 50, and the sealing mechanism 60.

As shown in FIGS. 2 and 4, the control device 70 controls the conveying by the conveying unit in the label issuing unit 30, specifically, the driving of the conveying roller 33A and the printing roller 34. The control device 70 controls the cutting by the cutter mechanism 37, specifically, the reciprocating of the moving cutter 37A with respect to the fixed cutter 37B. The control device 70 includes a preparatory operation mode execution unit 71 and a storage unit 72 as conceptual parts. For example, the preparatory operation mode execution unit 71 may be configured as software in which a program stored in the ROM is loaded on the RAM and executed by the CPU. Additionally, the preparatory operation mode execution unit 71 may be configured as hardware such as an electronic circuit.

The preparatory operation mode execution unit 71 executes a preparatory operation mode. The preparatory operation mode is an operation mode in which the mountless label Ls is conveyed a predetermined distance longer than a length of a portion extending from the shaft portion 36 to the cutter mechanism 37 in the mountless label Ls using the conveying rollers 33A and 33B and the printing roller 34 and is cut by the cutter mechanism 37 when the label L is not issued for more than a predetermined time. The predetermined time is, for example, 5 minutes to 120 minutes.

Figure 5:
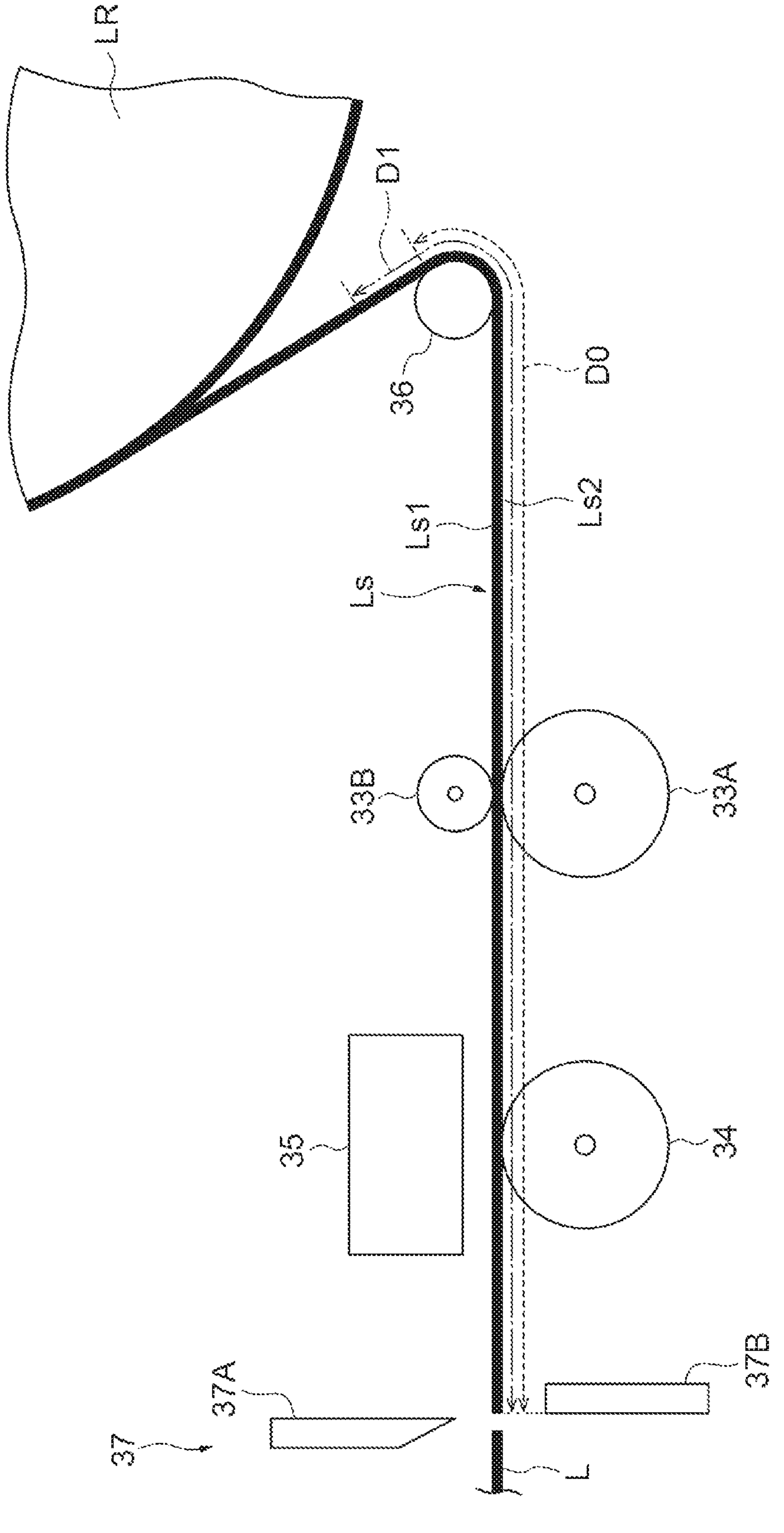
FIG. 5 is an enlarged view of a part of FIG. 3 for illustrating a predetermined distance in a preparatory operation mode.

As shown in FIG. 5, a length DO of the portion extending from the shaft portion 36 to the cutter mechanism 37 in the mountless label Ls is, for example, a distance from an upstream end of a contact area with the shaft portion 36 in the mountless label Ls to a position contacting the blade of the cutter mechanism 37. In other words, the length D0 of the portion extending from the shaft portion 36 to the cutter mechanism 37 in the mountless label Ls is a distance from a position corresponding to the shaft portion 36 in the conveying path of the mountless label Ls to a position corresponding to the cutter mechanism 37. A predetermined distance D1 of the mountless label Ls to be conveyed in the preparatory operation mode is set to be longer than the length D0 by a predetermined distance.

When issuing a new label L, the preparatory operation mode execution unit 71 executes the preparatory operation mode if it is determined that the label L is not issued for more than a predetermined time since the label L is issued at the last time. The preparatory operation mode execution unit 71 prohibits the execution of the preparatory operation mode when there is an input of turning off the preparatory operation mode via the display input panel 80. The preparatory operation mode execution unit 71 prohibits the issuing of a new label L when the mountless label Ls separated by cutting in the preparatory operation mode is detected by the label detection sensor 39 after the preparatory operation mode is executed.

The storage unit 72 is, for example, an auxiliary storage device such as a hard disk, an optical disk, a flash memory, and an SSD (solid state drive). The storage unit 72 stores the predetermined distance D1 and the predetermined time in the preparatory operation mode. The storage unit 72 stores product information for each product. The product information may include, for example, information such as a product name, a nutritional component, a product unit price per 100 g, and a raw material name.

(3) Display Input Panel

The display input panel 80 is connected to the control device 70. An operator can execute various operations of the packaging device 1 via the display input panel 80. When the preparatory operation mode execution unit 71 executes the preparatory operation mode, the display input panel 80 notifies that the preparatory operation mode is to be executed. The notification may be executed, for example, by at least one of display and sound. After executing the preparatory operation mode, the display input panel 80 may output an instruction of removing the mountless label Ls separated by cutting in the preparatory operation mode from the label issuing port 30H. The output may be executed, for example, by at least one of display and sound.

The display input panel 80 receives an input of the predetermined time. On the display input panel 80, the predetermined time can be input in 5 minute intervals or 10 minute intervals. The display input panel 80 receives an input of the predetermined distance D1. The display input panel 80 receives an input of prohibiting (turning off) the execution of the preparatory operation mode. The display input panel 80 receives an input of allowing (turning on) the execution of the preparatory operation mode. The display input panel 80 constitutes a notification unit, an output unit, a first input unit, a second input unit, and a third input unit.

(4) Operation of Label Printing Device

Figure 6:
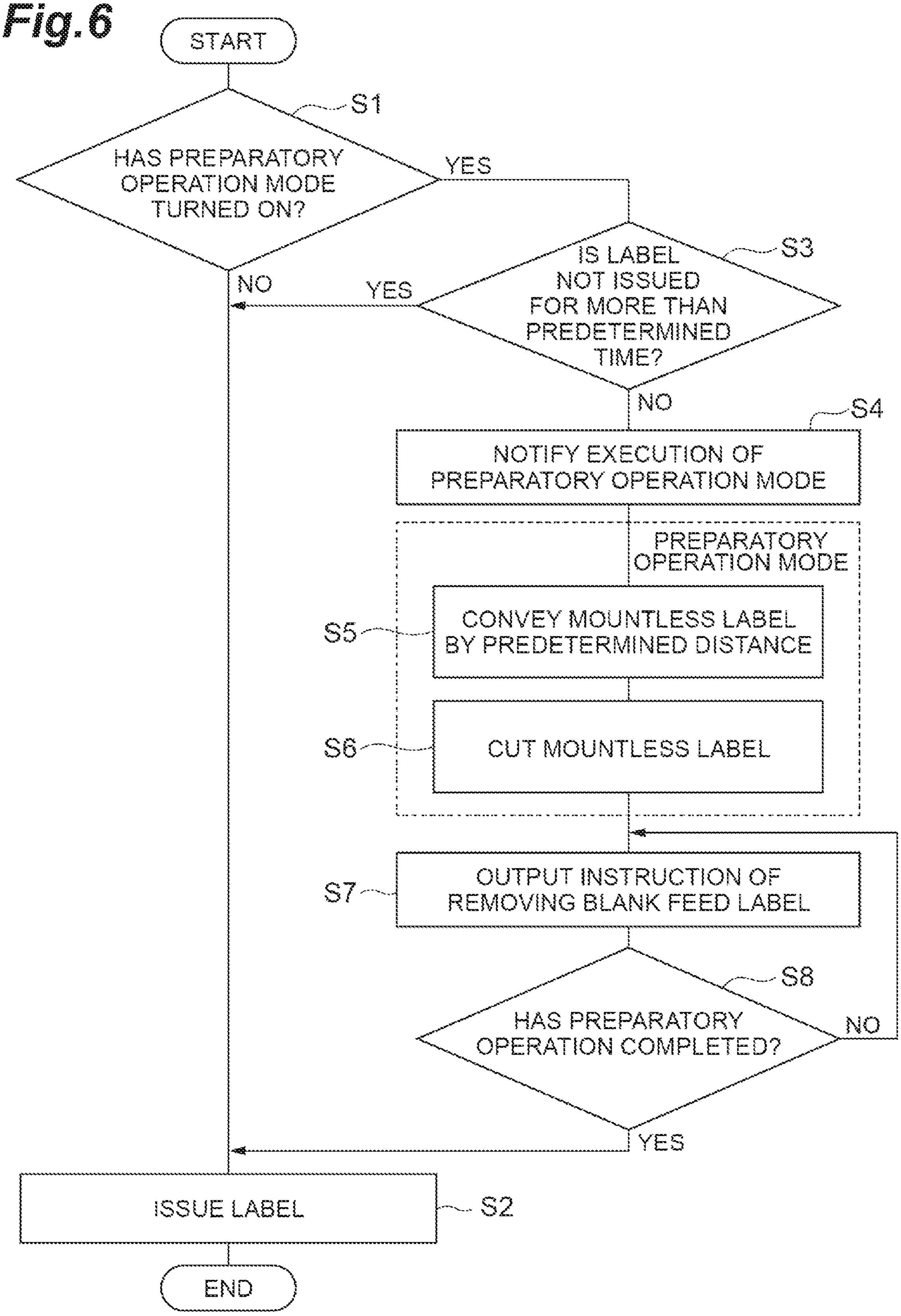
FIG. 6 is a flowchart showing an operation of the label printing device of FIG. 1.

Next, an operation when issuing a new label L in the label printing device 5 will be described with reference to the flowchart of FIG. 6.

First, it is determined whether or not the preparatory operation mode is set to an ON state (or an OFF state) by the preparatory operation mode execution unit 71 (step S1). In the case of NO in step S1, a new label L is issued from the label issuing port 30H without executing the preparatory operation mode (step S2). For example, in step S2, product information is printed on the printing surface Ls1 of the mountless label Ls by the thermal head 35 while the mountless label Ls is conveyed, the mountless label Ls is cut for each product information of one product by the cutter mechanism 37, and the label L is issued.

In the case of YES in step S1, the preparatory operation mode execution unit 71 determines whether or not the label L is not issued for more than a predetermined time, for example, on the basis of the elapsed time since the label L is issued by the label printing device 5 at the last time (step S3). In the case of YES in step S3, the routine proceeds to step S2 to issue a new label L from the label issuing port 30H without executing the preparatory operation mode. On the other hand, in the case of NO in step S3, the preparatory operation mode execution unit 71 notifies the preparatory operation mode to be executed via the display input panel 80 (step S4).

For example, when an operation input (touching the confirmation button on the screen) for confirming the execution of the preparation operation mode is made by the operator via the display input panel 80 after step S4, the preparatory operation mode execution unit 71 executes the preparatory operation mode. In the preparatory operation mode, the preparatory operation mode execution unit 71 controls the driving of the conveying roller 33A and the printing roller 34 to convey the mountless label Ls by the predetermined distance D1 (step S5). Then, the preparatory operation mode execution unit 71 controls the driving of the cutter mechanism 37 to cut the mountless label Ls conveyed by the predetermined distance D1 and separate the portion of the predetermined distance D1 in the mountless label Ls as the blank feed label (step S6).

After step S6, the preparatory operation mode execution unit 71 outputs an instruction of removing the blank feed label from the label issuing port 30H via the display input panel 80 (step S7). The preparatory operation mode execution unit 71 determines whether or not the preparatory operation for issuing the label L is completed (step S8). In step S8, when the label detection sensor 39 detects the blank feed label, it is determined as NO (the preparatory operation is not completed). Further, in step S8, for example, when a sensor or the like detects that a door portion in the label affixing unit 50 or the like is not closed, it is determined as NO. Further, in step S8, when the weighed value of the article M weighed again while being placed on the weighing unit 13 when issuing a new label L is not stable (the amount of fluctuation is equal to or larger than a specified value), it is determined as NO.

In the case of NO in step S8, the issuing of a new label L is prohibited and the routine returns to step S7 to output an instruction of removing the blank feed label again via the display input panel 80. In the case of YES in step S8, the issuing of a new label L is allowed and the routine proceeds to step S2 to issue a new label L from the label issuing port 30H.

(5) Characteristic and Operation/Effect

In the label printing device 5, even if there is a habitual portion wound on the shaft portion 36 in the mountless label Ls when the label L is not issued for more than a predetermined time, it is possible to remove the habitual portion in advance by executing the preparatory operation mode. Accordingly, it is possible to prevent the habitual portion from being stuck to the moving cutter 37A and the fixed cutter 37B of the cutter mechanism 37 or prevent the habitual portion from being stuck to an unexpected place. That is, according to the label printing device 5, it is possible to suppress the occurrence of device abnormality. It is possible to reduce downtime caused by device abnormality. It is possible to reduce the stress of the operator due to the recovery work from the device abnormality.

In the label printing device 5, the shaft portion 36 changes the conveying direction of the mountless label Ls toward the thermal head 35. In this case, the shaft portion 36 can guide the mountless label Ls toward the downstream thermal head 35.

In the label printing device 5, the preparatory operation mode execution unit 71 of the control device 70 executes the preparatory operation mode if it is determined that the label L is not issued for more than a predetermined time since the label L is issued at the last time when issuing a new label L. In this case, it is possible to remove the habitual portion of the mountless label Ls when issuing a new label L.

In the label printing device 5, the label detection sensor 39 is provided in the periphery of the label issuing port 30H. The label detection sensor 39 detects the presence or absence of the mountless label Ls (that is, the blank feed label) separated by cutting in the preparatory operation mode. The preparatory operation mode execution unit 71 of the control device 70 prohibits the issuing of a new label L when the label detection sensor 39 detects the blank feed label. If the blank feed label is not taken out and left as it is in the periphery of the label issuing port 30H, the blank feed label may interfere and cause device abnormality when issuing a new label L. Thus, in the label printing device 5, the issuing of a new label L is prohibited (not executed) by determining that the blank feed label is left as it is in the periphery of the label issuing port 30H when the label detection sensor 39 detects the blank feed label. Accordingly, it is possible to avoid device abnormality which can be caused by the interfere of the blank feed label when issuing a new label L.

When the label printing device 5 executes the preparatory operation mode, the display input panel 80 notifies that the preparatory operation mode is to be executed. In this case, the operator can be effectively notified of the execution of the preparatory operation mode.

In the label printing device 5, the display input panel 80 outputs an instruction of removing the blank feed label from the label issuing port 30H after the preparatory operation mode is executed. In this case, the operator can be urged to remove the blank feed label.

In the label printing device 5, the display input panel 80 receives an input of a predetermined time. In this case, the operator can set a desired predetermined time via the display input panel 80.

In the label printing device 5, the display input panel 80 receives an input of the predetermined distance D1. In this case, the operator can set a desired predetermined distance D1 via the display input panel 80.

In the label printing device 5, the display input panel 80 receives an input of prohibiting the execution of the preparatory operation mode. In this case, the operator can prohibit the execution of the preparatory operation mode via the display input panel 80.

(6) Modified Example

Although an embodiment has been described above, an aspect of the present disclosure is not limited to the above-described embodiment, and various modifications can be made without departing from the spirit of the present disclosure.

In the above-described embodiment, the predetermined time may be a predetermined fixed value. In the above-described embodiment, the predetermined distance D1 may be a predetermined fixed value. Additionally, when the position of the shaft portion 36 is movable by a damper mechanism according to the size of the outer diameter of the label roll LR, the length D0 (see FIG. 5) changes according to the movement. In this case, a distance larger than the maximum value of the fluctuating length D0 may be set as the predetermined distance D1.

In the above-described embodiment, the label printing device 5 may include one or more other shaft portions instead of or in addition to the shaft portion 36. In this case, the predetermined distance D1 may be a distance longer than the length of the portion of the mountless label Ls from the most upstream shaft portion to the cutter mechanism 37 among the plurality of shaft portions.

In the above-described embodiment, the preparatory operation mode is executed if it is determined that the label L is not issued for more than a predetermined time when issuing a new label L, but the present disclosure is not limited thereto. For example, when the operator determines that the label L is not issued for more than a predetermined time, the preparatory operation mode may be executed by the operation input of the operator. In short, the preparatory operation mode may be executed for the mountless label Ls in which the label L is not issued for more than a predetermined time.

In the above-described embodiment, the label printing device 5 included in the packaging device 1 has been described, but the present disclosure is not limited thereto. The label printing device 5 may be included in various devices. The label printing device 5 may be included in, for example, a bottom-paste type label affixing device for affixing a label on the lower surface of a product. The label printing device 5 may be included in, for example, an electronic scale. Further, a plurality of the label printing devices 5 may be included in a device such as the packaging device 1. In this case, when the label L is not issued for any one of the plurality of label printing devices 5 for more than a predetermined time, the preparatory operation mode may be executed by any of the label printing devices 5 or the preparatory operation mode may be executed by all the label printing devices 5. Further, the label printing device 5 may be a device that functions independently.

Various materials and shapes can be applied to the respective configurations in the above-described embodiment and modified example without being limited to the above-described materials and shapes. Each configuration in the above-described embodiment or modified example can be arbitrarily applied to each configuration in another embodiment or modified example. A part of each configuration in the above-described embodiment or modified example can be appropriately omitted without departing from the spirit of an aspect of the present disclosure.

According to an aspect of the present disclosure, it is possible to provide the label printing device capable of suppressing the occurrence of device abnormality.

What is claimed is:

1. A label printing device for executing a printing process on a mountless label, comprising:
- a conveying unit configured to convey the mountless label in its longitudinal direction;
- a shaft portion configured to change a conveying direction of the mountless label while a non-adhesive side of the mountless label to be conveyed is wound thereon;
- a cutting unit configured to cut the mountless label of which the conveying direction is changed by the shaft portion and issue a label; and
- a controller configured to control the conveying unit and the cutting unit,
- wherein the controller executes a preparatory operation mode in which the mountless label is conveyed a predetermined distance longer than a length of a portion extending from the shaft portion to the cutting unit in the mountless label by the conveying unit and is cut by the cutting unit when a label is not issued for more than a predetermined time.

2. The label printing device according to claim 1, further comprising:
- a printing unit configured to execute a printing process on the mountless label conveyed by the conveying unit,
- wherein the shaft portion changes the conveying direction of the mountless label toward the printing unit.

3. The label printing device according to claim 1,
- wherein the controller executes the preparatory operation mode if it is determined that a label is not issued for more than the predetermined time since the label is issued at the last time when issuing a new label.

4. The label printing device according to claim 1, further comprising:
- a label detection sensor configured to be provided in the periphery of a label issuing port and detects the presence or absence of the mountless label separated by cutting in the preparatory operation mode,
- wherein the controller prohibits the issuing of a new label when the label detection sensor detects the mountless label.

5. The label printing device according to claim 1, further comprising:
- a notification unit configured to notify that the preparatory operation mode is to be executed when executing the preparatory operation mode.

6. The label printing device according to claim 1, further comprising:
- an output unit configured to output an instruction of removing the mountless label separated by cutting in the preparatory operation mode from the label issuing port after the preparatory operation mode is executed.

7. The label printing device according to claim 1, further comprising:

a first input unit configured to receive an input of the predetermined time.

8. The label printing device according to claim 1, further comprising:

a second input unit configured to receive an input of the predetermined distance.

9. The label printing device according to claim 1, further comprising:

a third input unit configured to receive an input of prohibiting the execution of the preparatory operation mode.

* * * * *